x(12) United States Patent
Grinchuk et al.

(10) Patent No.: US 8,160,242 B2
(45) Date of Patent: Apr. 17, 2012

(54) EFFICIENT IMPLEMENTATION OF ARITHMETICAL SECURE HASH TECHNIQUES

(75) Inventors: Mikhail Grinchuk, San Jose, CA (US);
Anatoli Bolotov, Cupertino, CA (US);
Lay D. Ivanovic, Sunnyvale, CA (US);
Andrej A. Zolotykh, Moscow (RU);
Alexei V. Galatenko, Moscow (RU)

(73) Assignee: LSI Corporation, Milpitas, CA (US)

( * ) Notice: Subject to any disclaimer, the term of this patent is extended or adjusted under 35 U.S.C. 154(b) by 774 days.

(21) Appl. No.: 12/246,812

(22) Filed: Oct. 7, 2008

(65) Prior Publication Data

US 2010/0086127 A1    Apr. 8, 2010

(51) Int. Cl.
*H04L 1/00* (2006.01)
*H04L 9/00* (2006.01)
*H04L 9/28* (2006.01)

(52) U.S. Cl. .......................... 380/28; 380/181
(58) Field of Classification Search .............. 380/28
See application file for complete search history.

(56) References Cited

U.S. PATENT DOCUMENTS

| | | | | |
|---|---|---|---|---|
| 5,133,069 A * | 7/1992 | Asato et al. | ................... | 713/401 |
| 5,241,633 A * | 8/1993 | Nishi | ........................... | 712/216 |
| 6,192,129 B1 * | 2/2001 | Coppersmith et al. | ........ | 380/259 |
| 6,829,355 B2 | 12/2004 | Lilly | ............................... | 380/28 |
| 7,142,669 B2 * | 11/2006 | Dworkin et al. | ................ | 380/28 |
| 7,143,699 B2 * | 12/2006 | Brock et al. | .................. | 102/502 |
| 7,346,816 B2 * | 3/2008 | Liu | ................................ | 714/718 |
| 2009/0111491 A1 * | 4/2009 | Lemberg | ....................... | 455/466 |

OTHER PUBLICATIONS

Schneier, Bruce, Applied Cryptography, Copyright 1996, pp. 436-437, 442-443.*
Schneier, Bruce. Applied Cryptography, Copyright 1996, pp. 436-437, 442-443.*
Kent, S., "IP Authentication Header", RFC 4302, Dec. 2005, pp. 1-34.
Krawczyk, H. et al., "HMAC: Keyed-Hashing for Message Authentication", RFC 2104, Feb. 1997, pp. 1-11.
Kaufman, C., "Internet Key Exchange (IKEv2) Protocol", RFC 4306, Dec. 2005, pp. 1-99.
Rivest, R., "The MD5 Message-Digest Algorithm", RFC 1321, Apr. 1992, pp. 1-21.
NIST, "Draft FIPS PUB 180-2 (+ Change Notice to include SHA-224), Secure Hash Standard", Feb. 25, 2004, pp. 1-79.
Wikipedia, the free encyclopedia, "SHA hash functions", http://en.wikipedia.org/wiki/SHA-1, 9 pages.
Housley, R., "224-bit One-way Hash Function: SHA-224", RFC 3874, Sep. 2004, pp. 1-6.

\* cited by examiner

*Primary Examiner* — Kambiz Zand
*Assistant Examiner* — Dant Shaifer Harriman
(74) *Attorney, Agent, or Firm* — Christopher P. Maiorana, PC

(57) ABSTRACT

An apparatus including an initialization circuit and a hash computation circuit. The initialization circuit may be configured to present a number of initialization values. The hash computation circuit may be configured to generate hash values for the message in response to the padded message blocks and the initialization values. The hash computation circuit generally performs a diagonal cut technique that simultaneously uses values from a plurality of different cycle rounds in a single cycle round analog.

21 Claims, 7 Drawing Sheets

(A)    (B)

EFFICIENT IMPLEMENTATION OF ARITHMETICAL SECURE HASH TECHNIQUES

FIELD OF THE INVENTION

The present invention relates to data integrity verification generally and, more particularly, to a method and/or apparatus for efficiently implementing arithmetical secure hash techniques.

BACKGROUND OF THE INVENTION

Secure hash functions, such as Message Digest version 5 (MD5), Secure Hash Algorithm 1 (SHA-1) and SHA-2 family of hash functions, including SHA-224, SHA-256, SHA-384 and SHA 512, have certain desirable attributes. For example, the hash functions are one-way, the chances of a collision are low, and the hash value changes drastically for even minor file alterations. The one-way feature means that it is exceptionally unlikely that the contents of a file could be recreated using only the hash value. The low chance of a collision means that it is unlikely that two different files could produce the same value. Drastic changes in the hash value, for even minor alterations, make any alteration, even the slightest, easily detectable.

The secure hash functions are used to process messages to produce message digests. The functions enable the determination of message integrity and are widely used in generation and verification of digital signatures, message authentication codes (MACs), and key exchange mechanisms (KEMs).

Each function has two stages: preprocessing and hash computation. Preprocessing involves padding a message, parsing the padded message into blocks, and setting initialization values. Preprocessing does not require laborious computations. Hash computation successively processes blocks of the padded message and generates a series of hash values. A final hash value generated by the hash computation is used to determine the message digest. The hash computation involves hard computations.

Certain applications require very fast implementation of the secure hash techniques. Currently, only a hardware implementation of the hash computation stage can meet the throughput requirements in such applications. An efficient hardware implementation is one that allows a message block to be processed in an acceptable time and preferably at low-cost.

The throughput of a scheme computation can be evaluated based on the scheme depth, i.e., the number of logic cells in the longest path from scheme input (or flip-flop output) to scheme output (or flip-flop input). The logical basis of the scheme computation can include AND, OR and NOT cells. NOT cells are not considered during depth computation. Low depth of the scheme allows production of a high-frequency hardware design for the scheme. If the scheme depth is too high, the high-frequency implementation is not possible.

The throughput of the scheme that implements the hash computation stage depends on the target frequency and number of time units (i.e., clock cycles) utilized to process one message block. The rough estimate of the scheme cost can be based on the number of logic cells and memory units (flip-flops) used: the higher the number of used cells and flip-flops is, the higher is the cost. Hence, cost reduction is roughly equivalent to the reduction of the scheme area that generally also grows with the growth of the number of used cells and registers.

SUMMARY OF THE INVENTION

The present invention concerns an apparatus including an initialization circuit and a hash computation circuit. The initialization circuit may be configured to present a number of initialization values. The hash computation circuit may be configured to generate hash values for the message in response to the padded message blocks and the initialization values. The hash computation circuit generally performs a diagonal cut technique that simultaneously uses values from a plurality of different cycle rounds in a single cycle round analog.

The objects, features and advantages of the present invention include providing a method and/or apparatus for efficiently implementing arithmetical secure hash techniques that may (i) provide a number of optimizations for secure hash functions, (ii) reduce cost, (iii) reduce scheme depth, (iv) reduce area used, (v) support high-frequency designs and/or (vi) eliminate storage of constants used by the secure hash functions.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
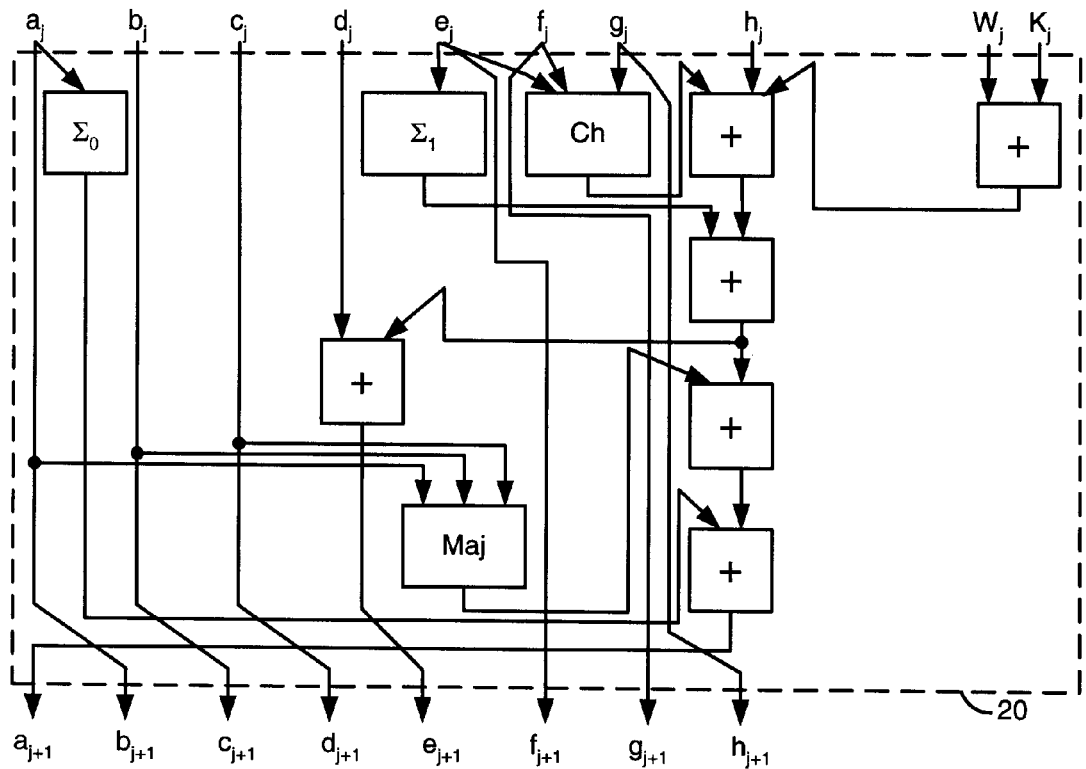
FIG. 1 is a diagram illustrating a straightforward implementation of a SHA-256 cycle round.

Embodiments of the present invention generally provide techniques for efficient hardware implementation of arithmetical secure hash techniques. The techniques described herein are generally applicable to the SHA-2 family (e.g., SHA-224, SHA-256, SHA-384, SHA-512, etc.). The techniques may also be applied to SHA-1 and MD5. However, the techniques in accordance with the present invention may also be applied to other hashing schemes with similar structure. The hardware implementation of arithmetical secure hash techniques in accordance with the present invention generally perform block processing. In one example, preprocessing of a message to obtain blocks may be performed either by some external hardware or by software, e.g. using an embedded processor. Separating the preprocessing from the hash computation generally adds flexibility to hash function implementation.

The processing of one block of a message by a SHA-256 hash computation stage may be expressed as follows.

The input comprises a 512-bit message block $M_i$ and previous 32-bit hash values $H_1^{i-1}, H_2^{i-1}, \ldots, H_8^{i-1}$.

A set of variables (e.g., a, b, c, d, e, f, g, h) are initialized with the previous 32-bit hash values: $a:=H_1^{i-1}$, $b:=H_2^{i-1}, \ldots, h:=H_8^{i-1}$ Then, the following cycle is applied:
For j=0 to 63

$$T_1:=h+\Sigma_1(e)+Ch(e,f,g)+K_j+W_j$$

$$T_2:=\Sigma_0(a)+Maj(a,b,c)$$

$$h:=g$$

$$g:=f$$

$$f:=e$$

$$e:=d+T_1$$

$$d:=c$$

$$c:=b$$

$$b:=a$$

$$a:=T_1+T_2.$$

The functions Ch, Maj, $\Sigma_1$, $\Sigma_2$, $W_j$, $K_j$ are defined below.

Finally, the output is assigned. The output includes new hash values $H_1^i, H_2^i, \ldots, H_8^i$, where $$H_1^i:=a+H_1^{i-1}, H_2^i:=b+H_2^{i-1}, \ldots, H_8^i:=h+H_8^{i-1}.$$

Using the following notations:
$\wedge$ for bitwise AND,
$\vee$ for bitwise OR,
$\oplus$ for bitwise XOR,
$\neg$ for bitwise complement,
$+$ for mod $2^{32}$ addition,
$RotR^n$ for right rotation by n bits,
$RotL^n$ for left rotation by n bits,
$ShR^n$ for right shift by n bits,
$ShL^n$ for left shift by n bits,
the functions Ch, Maj, $\Sigma_1$, $\Sigma_2$, may be defined as follows:

$$Ch(x,y,z)=(x \wedge y)\oplus(\neg x \wedge z);$$

$$Maj(x,y,z)=(x \wedge y)\oplus(x \wedge z)\oplus(y \wedge z);$$

$$\Sigma_0(x)=RotR^2(x)\oplus RotR^{13}(x)\oplus RotR^{22}(x);$$

$$\Sigma_1(x)=RotR^6(x)\oplus RotR^{11}(x)\oplus RotR^{25}(x).$$

The values $W_j$ may be defined as follows:
if j=0, 1, ..., 15, $W_j$ is set to $M_j^i$, where $M_0^i$ denotes the first 32 bits of the message block $M_i$, $M_1^i$ denotes the next 32 bits and so on up to $M_{15}^i$;
if j=16, 17, ..., 63, $W_j$ is set to $$\sigma_1(W_{j-2})+W_{j-7}+\sigma_0(W_{j-15})+W_{j-16};$$

where $$\sigma_0(x)=RotR^7(x)\oplus RotR^{18}(x)\oplus ShR^3(x);$$

$$\sigma_1(x)=RotR^{17}(x)\oplus RotR^{19}(x)\oplus ShR^{10}(x).$$

The notation $K_j$ denotes a sequence of predefined constant words (e.g., in hexadecimal, $K_0$=428a2f98, $K_1$=71374491, etc.). For example, SHA-256 has a list of sixty-four predefined 32-bit constants. Because SHA-224 uses the same scheme as SHA-256, the predefined constants for SHA-224 are the same. In another example, SHA-512 uses a list of eighty predefined 64-bit constants. The predefined constants for SHA-384 are exactly the same as for SHA-512. Predefined constants that may be used for SHA-1 and MD5 are described below.

Referring to FIG. 1, a diagram of a module 20 is shown illustrating a straightforward implementation of a j-th cycle round of a SHA-256 computation stage based on the above definitions. Each cycle round of the SHA-256 computation stage may be implemented similarly to the module 20. The values of the variables a, b, . . . , h at the beginning of the j-th cycle round may be denoted by $a_j, b_j, \ldots, h_j$. The values of the variables a, b, . . . , h at the end of the j-th cycle round may be denoted by $a_{j+1}, b_{j+1}, \ldots, h_{j+1}$.

Several modules 20 may be successively linked to allow a scheme to perform several cycle rounds in one time unit (e.g., one clock cycle). The depth of the straightforward implementation of one cycle round according to the definitions presented above is more than 35. If N modules 20, each implementing one cycle round, are successively linked, the depth of the scheme is more than 35N, and at least 64/N time units are used to process one block of a padded message. The module 20 may be dramatically optimized by implementing various aspects of the present invention.

The straightforward implementation of the logical functions Maj and Ch according to the definitions above has a depth of 5 for the function Maj (as $\oplus$ has a depth of 2 in AND, OR, NOT basis), and a depth of 3 for the function Ch. In one example, the functions Maj and Ch may be optimized by equivalently redefining the functions as expressed in the following Equations 1 and 2:

$$Maj(x,y,z)=(x \wedge y) \vee (y \wedge z) \vee (x \wedge z) \qquad \text{Eq. 1}$$

$$Ch(x,y,z)=(x \wedge y) \vee (\neg x \wedge z). \qquad \text{Eq. 2}$$

The implementation of the functions Maj and Ch based upon the Equations 1 and 2 reduces the depth to 3 for the function Maj and to 2 for the function Ch.

Figure 2:
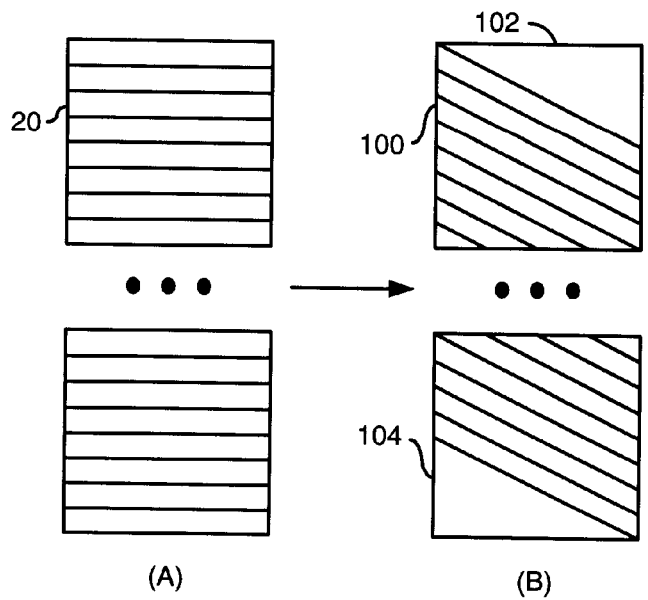
FIG. 2 is a diagram illustrating a diagonal cut technique in accordance with an embodiment of the present invention.

Referring to FIG. 2, a diagram is shown illustrating a comparison between a conventional hash technique (FIG. 2(A)) and a diagonal cut technique in accordance with an embodiment of the present invention (FIG. 2(B)). The diagonal cut technique generally provides a significant improvement for efficient implementation of hash functions. For example, by implementing the diagonal cut technique the values for a number of different cycle rounds may be used simultaneously, in an analog of one cycle round. If one cycle round with the module 20 is illustrated as a rectangle where an upper boundary represents the input and a lower boundary represents the output, the whole cycle may be shown as a column of such rectangles, and the hash computation is equivalent to going from the upper boundary of the column to the lower boundary of the column.

Applying the diagonal cut technique in accordance with an aspect of the present invention, the rectangles may be replaced by parallelogram cycle rounds 100, an upper triangle 102 and a lower triangle 104. In general, the implementation of one parallelogram cycle round 100 may have a much lower depth in comparison with the implementation of one rectangle cycle round 20.

Referring again to FIG. 2, the lower triangle 104 may be replaced by a parallelogram cycle round similar to the parallelogram cycle rounds 100. Replacement of the lower triangle 104 with a parallelogram cycle round 100 generally results in some unnecessary computations being performed, but the results of the unnecessary computations may be ignored. The replacement of the lower triangle 104 by a parallelogram cycle round 100 generally reduces the number of structural modules in the scheme and, therefore, reduces the number of logic cells used. Thus, the scheme is made simpler. At the same time, replacement of the lower triangle 104 by the parallelogram cycle round 100 does not lead to a decrease of throughput: replacing the lower triangle 104 by the parallelogram cycle round 100 neither increases the scheme depth nor increases the number of time units to process one message block. The upper triangle 102 also may be replaced by a parallelogram cycle round 100 (the details of which are discussed below).

Figure 3:
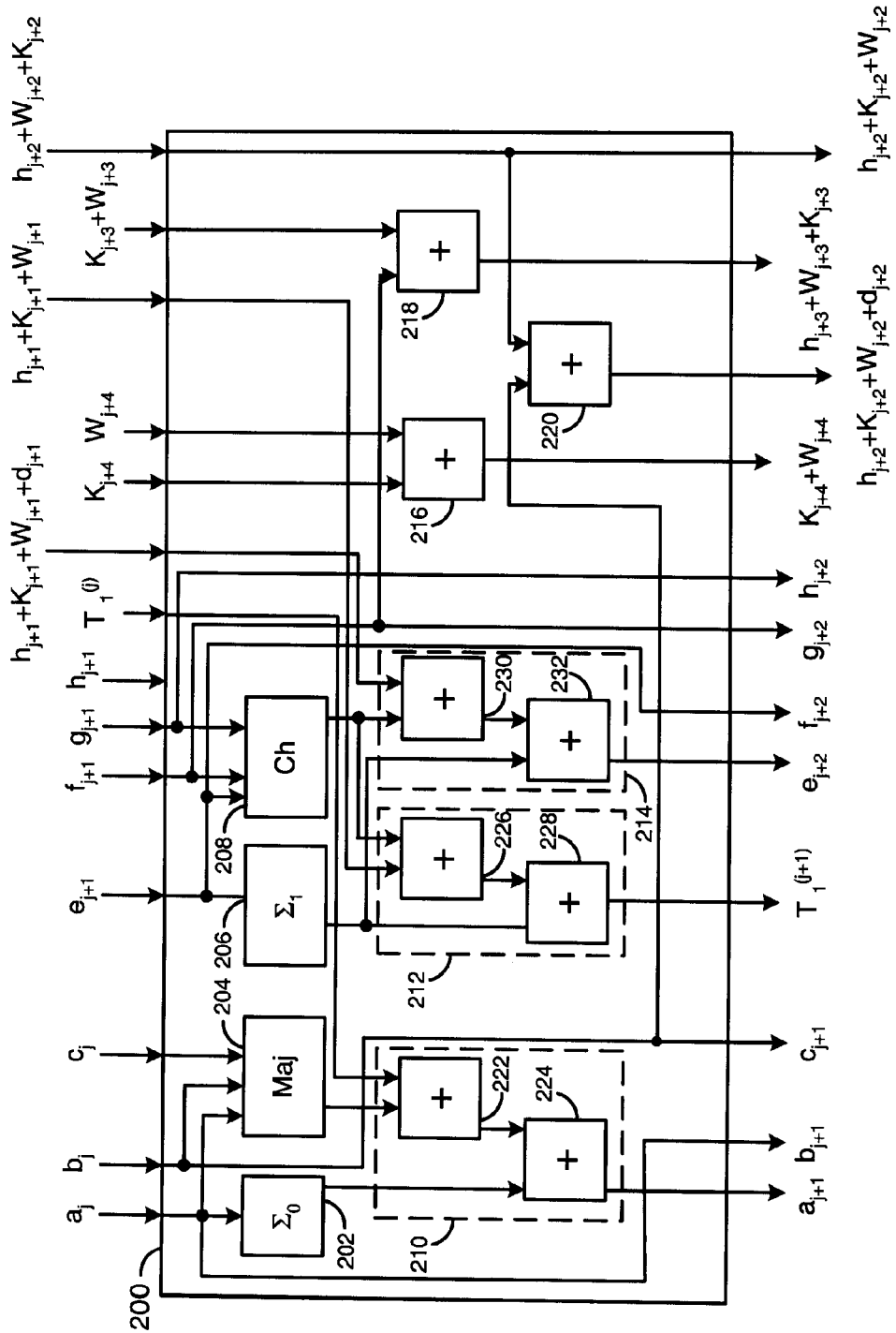
FIG. 3 is a diagram illustrating an implementation of a cycle round analog after diagonal cut in accordance with an embodiment of the present invention.

Referring to FIG. 3, a diagram of a module 200 is shown illustrating an implementation of a parallelogram cycle round analog in accordance with an embodiment of the present invention. The module 200 may comprise a function block (or circuit) 202, a function block (or circuit) 204, a function block (or circuit) 206, a function block (or circuit) 208, a logic block (or circuit) 210, a logic block (or circuit) 212, a logic block (or circuit) 214, a logic block (or circuit) 216, a logic block (or circuit) 218 and a logic block (or circuit) 220. The block 202 may implement the function $\Sigma_0$. The block 204 may implement the function Maj. The block 206 may implement the function $\Sigma_1$. The block 208 may implement the function Ch. The blocks 210, 212, 214, 216, 218 and 220 may implement mod $2^{32}$ addition.

The module 200 may have a depth of 25, where the function Maj is implemented according to Equation 1 above and the depth of a good implementation of the mod $2^{32}$ adders is 11. Similarly to the module 20, the values of the variables a, b, . . . , h at the beginning of the j-th cycle round may be denoted by $a_j$, $b_j$, . . . , $h_j$, $T_1^j$ may denote the value of $T_1$ assigned at the j-th cycle round, and $T_1^{j+1}$ may denote the value of $T_1$ assigned at the j+1 cycle round.

The block 200 may have a first input that may receive the signal $a_j$, a second input that may receive the signal $b_j$, a third input that may receive the signal $c_j$, a fourth input that may receive a signal (e.g., $e_{j+1}$), a fifth input that may receive a signal (e.g., $f_{j+1}$), a sixth input that may receive a signal (e.g., $g_{j+1}$), a seventh input that may receive a signal (e.g., $h_{j+1}$), an eighth input that may receive the signal $T_1^j$, a ninth input that may receive a signal representing $h_{j+1}+K_{j+1}+W_{j+1}+d_{j+1}$, a tenth input that may receive a signal (e.g., $K_{j+4}$), an eleventh input that may receive a signal (e.g., $W_{j+4}$), a twelfth input that may receive a signal representing $h_{j+1}+K_{j+1}+W_{j+1}$, a thirteenth input that may receive a signal representing $K_{j+3}+W_{j+3}$ and a fourteenth input that may receive a signal representing $h_{j+2}+W_{j+2}+K_{j+2}$. The block 200 may have a first output that may present signal (e.g., $a_{j+1}$), a second output that may present the signal (e.g., $b_{j+1}$), a third output that may present the signal (e.g., $c_{j+1}$), a fourth output that may present a signal (e.g., $T_1^{j+1}$), a fifth output that may present a signal (e.g., $e_{j+2}$), a sixth output that may present a signal (e.g., $f_{j+2}$), a seventh output that may present a signal (e.g., $g_{j+2}$), an eighth output that may present the signal (e.g., $h_{j+2}$), a ninth output that may present a signal representing $K_{j+4}+W_{j+4}$, a tenth output that may present a signal representing $h_{j+2}+K_{j+2}+W_{j+2}+d_{j+2}$, an eleventh output that may present a signal representing $h_{j+3}+K_{j+3}+W_{j+3}$, a twelfth output that may present a signal representing $h_{j+2}+W_{j+2}+K_{j+2}$.

The function block 202 has an input that may receive the signal $a_j$ and an output. The function block 204 has a first input that may receive the signal $a_j$, a second input that may receive the signal $b_j$, a third input that may receive the signal $c_j$ and an output. The function block 206 has an input that may receive the signal $e_{j+1}$ and an output. The function block 208 has a first input that may receive the signal $e_{j+1}$, a second input that may receive the signal $f_{j+1}$, a third input that may receive the signal $g_{j+1}$ and an output. The block 210 has a first input that may receive the output of the block 202, a second input that may receive the output of the block 204, a third input that may receive the signal $T_1^j$ and an output that may present the signal $a_{j+1}$. The block 212 has a first input that may receive the output of the block 206, a second input that may receive the output of the block 208, a third input that may receive the signal representing $h_{j+1}+K_{j+1}+W_{j+1}$ and an output that may present the signal $T_1^{j+1}$. The block 214 has a first input that may receive the output of the block 206, a second input that may receive the output of the block 208, a third input that may receive the signal representing $h_{j+1}+K_{j+1}+W_{j+1}+d_{j+1}$ and an output that may present the signal $e_{j+2}$. The block 216 has a first input that may receive the signal $K_{j+4}$, a second input that may receive the signal $W_{j+4}$ and an output that may present the signal representing $K_{j+4}+W_{j+4}$. The block 218 has a first input that may receive the signal $f_{j+1}$, a second input that may receive the signal representing $K_{j+3}+W_{j+3}$ and an output that may present the signal representing $h_{j+3}+K_{j+3}+W_{j+3}$. The block 220 has a first input that may receive the signal $b_j$, a second input that may receive the signal representing $h_{j+2}+W_{j+2}+K_{j+2}$ and an output that may present the signal representing $h_{j+2}+W_{j+2}+K_{j+2}+d_{j+2}$. The block 200 is further configured to present the input signals $a_j$, $b_j$, $e_{j+1}$, $f_{j+1}$ and $g_{j+1}$ as the output signals $b_{j+1}$, $c_{j+1}$, $f_{j+2}$, $g_{j+2}$ and $h_{j+2}$, respectively.

The block 210 may comprise a logic block 222 and a logic block 224. The logic blocks 222 and 224 may be implemented, in one example, as mod $2^{32}$ adders. The block 222 has a first input that may receive the output of the function block 204, a second input that may receive the signal $T_1^j$ and an output. The block 224 has a first input that may receive the output of the block 202, a second input that may receive the output of the block 222 and an output that may present the signal $a_{j+1}$.

The block 212 may comprise a logic block 226 and a logic block 228. The logic blocks 226 and 228 may be implemented, in one example, as mod $2^{32}$ adders. The block 226 has a first input that may receive the output of the function block 208, a second input that may receive the signal representing $h_{j+1}+K_{j+1}+W_{j+1}$ and an output. The block 228 has a first input that may receive the output of the block 206, a second input that may receive the output of the block 226 and an output that may present the signal $T_1^{j+1}$.

The block 214 may comprise a logic block 230 and a logic block 232. The logic blocks 230 and 232 may be implemented, in one example, as mod $2^{32}$ adders. The block 230 has a first input that may receive the output of the function block 208, a second input that may receive the signal representing $h_{j+1}+K_{j+1}+W_{j+1}+d_{j+1}$ and an output. The block 232 has a first input that may receive the output of the function block 206, a second input that may receive the output of the block 230 and an output that may present the signal $e_{j+2}$.

Another aspect of the present invention provides for simplification of two successive additions. For example, x+y+z equals A+B, where A=x⊕y⊕z, B=ShL$^1$(Maj(x, y, z)). The application of this equality allows the reduction of both the depth and the number of logic cells used in the implementation of a three-summand adder (e.g., the depth is generally reduced from 22 to 15). The application of this aspect of the present invention to the above implementation of the SHA-256 parallelogram cycle round module 200 is illustrated below in connection with FIG. 4.

Figure 4:
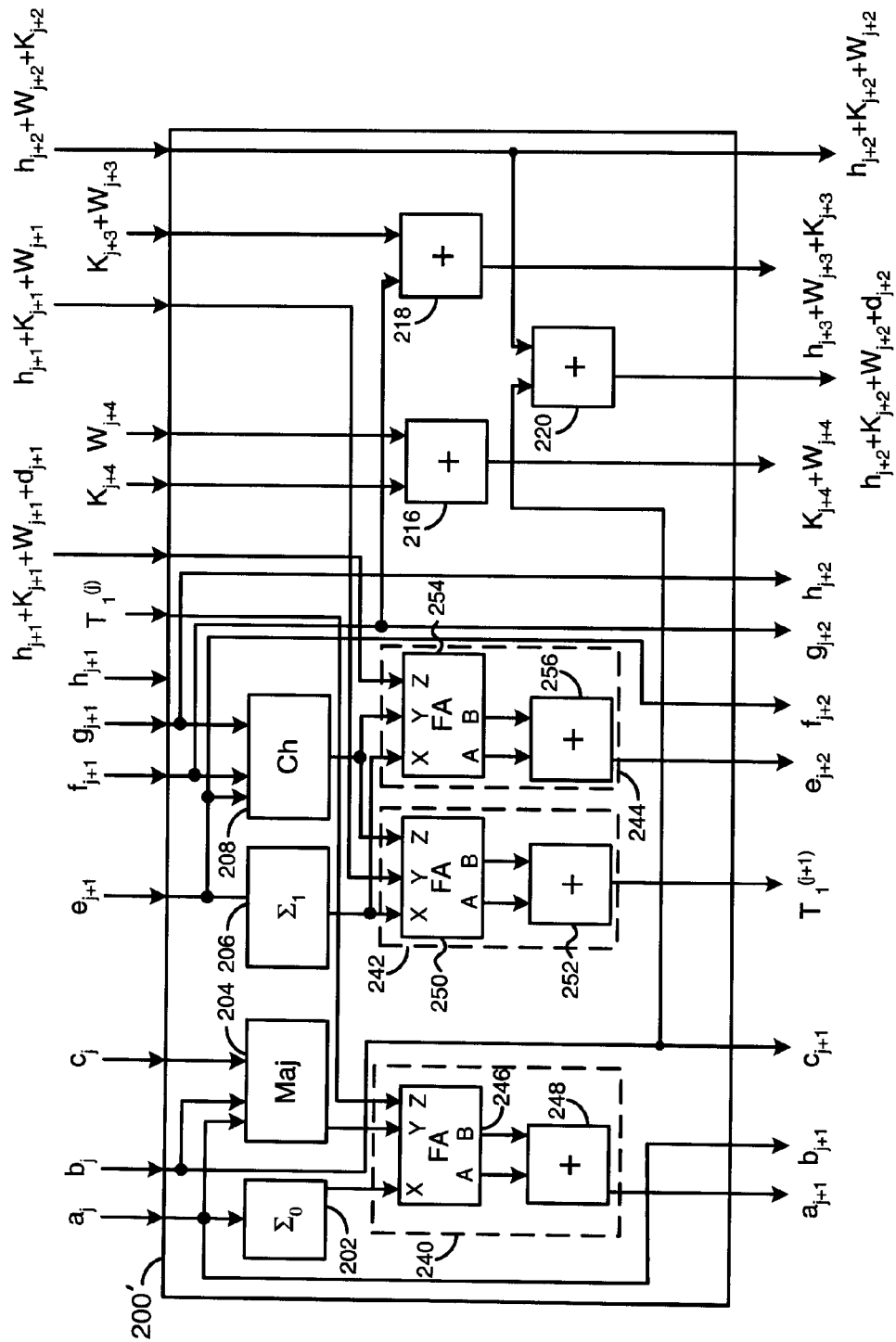
FIG. 4 is a diagram illustrating an implementation of a cycle round analog after diagonal cut and simplification of two successive additions in accordance with an embodiment of the present invention.

Referring to FIG. 4, a diagram of a module 200' is shown illustrating an implementation of a parallelogram cycle round analog including the addition simplification aspect in accordance with the present invention. The module 200' may be implemented similarly to the module 200, except that the blocks 210, 212 and 214 are replaced by blocks 240, 242 and 244 respectively. The block 240 may comprise a block (or circuit) 246 and a block (or circuit) 248. The block 242 may comprise a block (or circuit) 250 and a block (or circuit) 252. The block 244 may comprise a block (or circuit) 254 and a block (or circuit) 256. The blocks 246, 250 and 254 may comprise a full adder (FA) module. The blocks 248, 252 and 256 may comprise a mod $2^{32}$ adder. The full adder modules 246, 250 and 254 may have three 32-bit input wires (e.g., X, Y and Z) and two 32-bit output wires (e.g., A and B). The full adder modules 246, 250 and 254 are generally configured to generate the outputs A and B in response to the inputs X, Y and Z according to the equations: $A = X \oplus Y \oplus Z$ and $B = ShL^1(Maj(X,Y,Z))$. The depth of the scheme after implementation of the full adders 246, 250 and 254 is generally reduced to 18 (e.g., a FA implementation has a depth of 4, but the length of all paths associated with one input (e.g., X) of the FA module is generally only two, so the outputs of the blocks 202 and 206 (e.g., the functions $\Sigma_0$ and $\Sigma_1$) should be linked to the X inputs of the FA modules 246, 250 and 254 with the path length of two.

Figure 5:
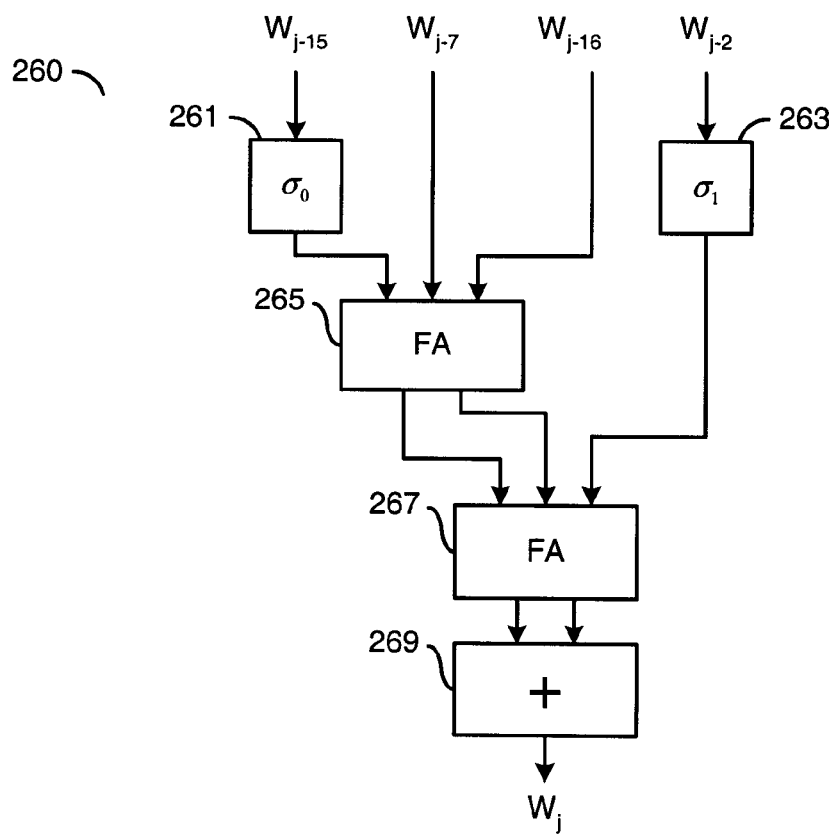
FIG. 5 is a diagram illustrating a W-generation module.

Referring to FIG. 5, a diagram of a module 260 is shown illustrating an example circuit configured to generate the function $W_j$. The simplification of two successive additions (described above) also may be applied to the W-generation module 260. The depth reduction is not critical for the W-generation module 260, however, the reduction of the number of logic cells used is generally beneficial. In one example, the W-generation module 260 may comprise a block 261, a block 263, a block 265, a block 267 and a block 269. The block 261 may implement the function $\sigma_0$, the block 263 may implement the function $\sigma_1$, the blocks 265 and 267 may be implemented as full adder modules. The block 269 may be implemented as a mod $2^{32}$ adder module.

The block 261 may have (i) an input that may receive a value $W_{j-15}$ and (ii) an output. The block 263 may have (i) an input that may receive a value $W_{j-2}$ and (ii) an output. The block 265 may have a first input that may receive the output of the block 261, a second input that may receive a value $W_{j-7}$, a third input that may receive a value $W_{j-16}$, a first output and a second output. The block 267 may have a first input that may receive the first output of the block 265, a second input that may receive the second output of the block 265, a third input that may receive the output of the block 263 and a first output and second output. The block 269 may have a first input that may receive the first output of the block 267, a second input that may receive the second output of the block 267 and an output that may present a signal representing the function $W_j$.

Figure 6:
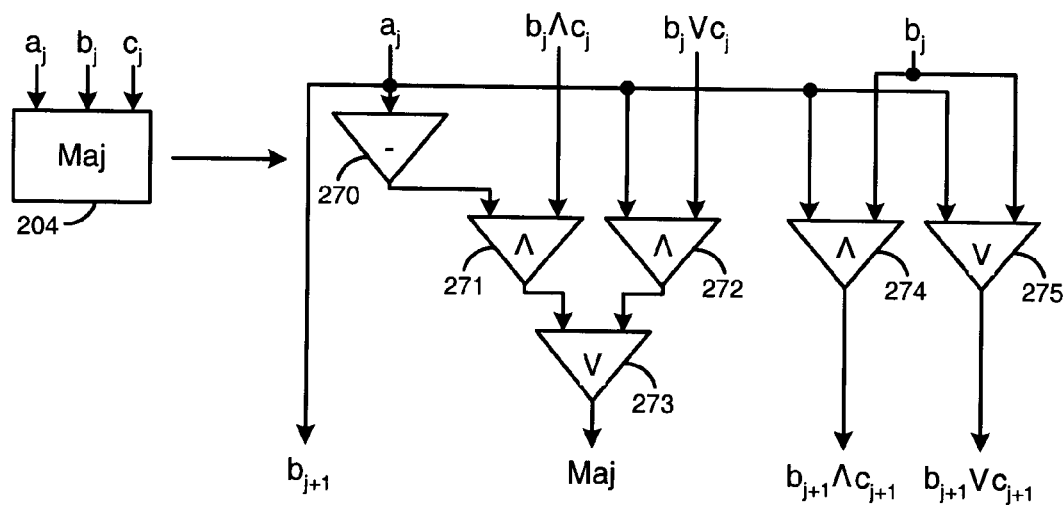
FIG. 6 is a diagram illustrating a throughput optimization of a Maj function block in accordance with an embodiment of the present invention.

Referring to FIG. 6, a diagram is shown illustrating a further throughput optimization in accordance with another aspect of the present invention. In the implementation shown in FIG. 4, most of the paths from inputs to outputs generally have a length less than or equal to 17. An exception is the path that goes through the function block 204 (Maj), the block 246 (FA) and the block 248 (+), which has a length of 18. However, the function Maj(a,b,c) may be rewritten as in the following Equation 3:

$$Maj(a,b,c) = (\neg a \wedge (b \wedge c)) \vee (a \wedge (b \vee c)). \qquad \text{Eq. 3}$$

The values of $b \wedge c$ and $b \vee c$ may be easily precomputed.

Implementation of the block 204 according to Equation 3 reduces the overall parallelogram implementation depth to 17. For example, the block 204 may comprise a block (or circuit) 270, a block (or circuit) 271, a block (or circuit) 272, a block (or circuit) 273, a block (or circuit) 274 and a block (or circuit) 275. The block 270 may be configured to generate a bitwise complement of an input signal. The blocks 271, 272 and 274 may be configured to perform a bitwise AND operation on a pair of input signals. The blocks 273 and 275 may be configured to perform a bitwise OR operation on a pair of input signals.

The signal $a_j$ may be presented to an input of the block 270, a first input of the block 272, a first input of the block 274 and a first input of the block 275. An output of the block 270 may be presented to a first input of the block 271. A second input of the block 271 may receive a signal representing $b_j \wedge c_j$. A second input of the block 272 may receive a signal representing $b_j \vee c_j$. The signal $b_j$ may be presented to a second input of the block 274 and a second input of the block 275. A first input of the block 273 may receive an output of the block 271. A second input of the block 273 may receive an output of the block 272. An output of the block 273 may present a signal (e.g., Maj) representing the function Maj(a,b,c). An output of the block 274 may present a signal representing $b_{j+1} \wedge c_{j+1}$. An output of the block 272 may present a signal representing $b_{j+1} \vee c_{j+1}$. The signal $a_j$ may be presented as the signal $b_{j+1}$.

As will be apparent to those skilled in the art, the application of the above techniques generally reduces the depth of one cycle round implementation more than two-fold and allows the design of a very fast scheme for a SHA-256 hash computation stage. The above techniques may be combined with further aspects of the present invention that reduce the number of logic cells used and hence reduces the cost of the scheme.

Another possible optimization is the elimination of the upper triangle 102 (illustrated in FIG. 2). The upper triangle 102 may be replaced by a number of parallelogram cycle rounds 100 in accordance with the present invention. For example, the upper triangle 102 may be replaced by the addition of a minus 4, a minus 3, a minus 2, and a minus 1 cycle rounds. In order to implement the replacement, the correct inputs for the parallelogram cycle rounds are passed at these rounds. The replacement of the upper triangle 102 by the parallelogram cycle rounds may significantly reduce the number of logic cells used because an "initialization phase" that is different from the "computation phase" is removed. The scheme depth is slightly increased by the replacement, and also the number of time units used to process one block of a padded message may grow slightly (the exact numbers depend on the number of parallelogram implementations linked in the scheme, or, equivalently, on the number of cycle rounds performed during one time unit). However, the increase in scheme depth and time units used is well balanced by the reduction in the number of cells used.

Yet another aspect of the present invention is the generation of constants used in the parallelogram cycle rounds 100. A straightforward way for storing the values of the constant words $K_0, K_1, \ldots, K_{63}$ is to use flip flops. However, the number of flip-flops becomes very large. Rather than store the constant words, a logical operator (or block, or circuit) with a 6-bit input (e.g., j) identifying the number of the cycle round and a 32-bit output (e.g., $K_j$) may be implemented. The implementation of the logical operator in accordance with the present invention generally allows the number of flip-flops to be reduced and does not increase the depth of the scheme. For example, less than 800 logic cells may be used instead of $64 \times 32 = 2048$ flip-flops. Also, the area and cost of the scheme implementation is reduced because flip-flops are more expensive and consume more area than the logic cells.

The other SHA-2 family hash functions (e.g., SHA-224, SHA-384 and SHA-512) are very similar to SHA-256. SHA-224 is defined in the exact same manner as SHA-256 with two exceptions: other initial hash values are used in the preprocessing stage, and the final hash is obtained by truncating the SHA-256-based hash output. SHA-512 is a variant of SHA-256 which operates with 64-bit words and performs 80 cycle rounds instead of 64. SHA-384 is defined in the exact same manner as SHA-512 with two exceptions: other initial hash values are used in the preprocessing stage, and the final hash is obtained by truncating the SHA-512-based hash output. Hence, the optimization techniques described herein may be directly applied to SHA-224, SHA-512, SHA-384 implementations.

The techniques in accordance with the present invention may also be applied to the generation of SHA-1 hash values. The processing of one block of a message by a SHA-1 hash computation stage may be defined as follows.

The input may comprise a 512-bit message block $M_i$ and previous 32-bit hash values $H_1^{i-1}, H_2^{i-1}, \ldots, H_5^{i-1}$.

A set of variables (e.g., a, b, c, d and e) are initialized with the previous hash values: $a := H_1^{i-1}, b := H_2^{i-1}, \ldots, e := H_5^{i-1}$.

Then, the following cycle is applied:

For j=0 to 79

$T := \text{Rot}L^5(a) + F_j(b,c,d) + e + K_j + W_j$ $e := d$ $d := c$ $c := \text{Rot}L^{30}(b)$ $b := a$ $a := T.$ The functions $F_j$, $W_j$, $K_j$ are defined below.

Finally, the output is assigned. The output comprises new hash values $H_1^i, H_2^i, \ldots, H_5^i$, where $H_1^i := a + H_1^{i-1}, H_2^i := b + H_2^{i-1}, \ldots, H_5^i := e + H_5^{i-1}.$ Using the notations described above, the function $F_j$ may be defined as follows:

if j=0, 1, ..., 19, then $F_j(x,y,z) = Ch(x,y,z) = (x \wedge y) \oplus (\neg x \wedge z);$ if j=20, 21, ..., 39 or j=60, 61, ..., 79, then $F_j(x,y,z) = \text{Parity}(x,y,z) = x \oplus y \oplus z;$ if j=40, 41, ..., 59, then $F_j(x,y,z) = \text{Maj}(x,y,z) = (x \wedge y) \oplus (x \wedge z) \oplus (y \wedge z).$ The values $W_j$ are defined as follows:

if j=0, 1, ..., 15, $W_j$ is set to $M_j^i$, where $M_0^i$ denotes the first 32 bits of the message block $M_i$, $M_1^i$ denotes the next 32 bits and so on up to $M_{15}^i$;

if j=16, 17, ..., 63, $W_j$ is set to $\text{Rot}L^1(W_{j-3} \oplus W_{j-8} \oplus W_{j-14} \oplus W_{j-16}).$ The notation $K_j$ denotes a sequence of predefined constant words (e.g., in hexadecimal, $K_j = 5a827999$ for j=0, 1, ..., 19, $K_j = 6ed9eba1$ for j=20, 21, ..., 39, $K_j = 8f1bbcdc$ for j=40, 41, ..., 59, $K_j = ca62c1d6$ for j=60, 61, ..., 79).

Figure 7:
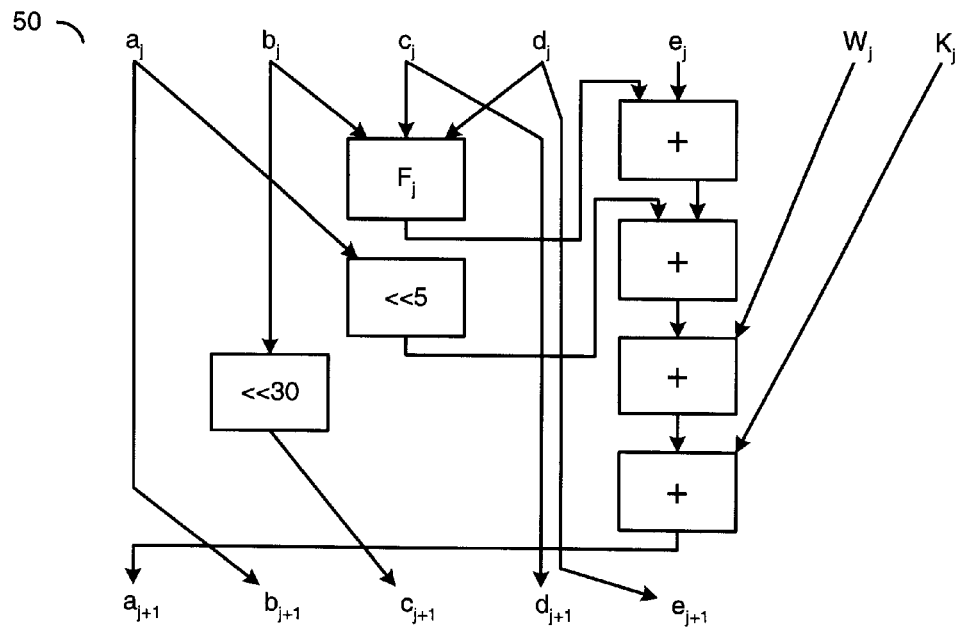
FIG. 7 is a diagram illustrating a straightforward implementation of a SHA-1 cycle round.

Referring to FIG. 7, a diagram of a module 50 is shown illustrating an example of a straightforward implementation of a SHA-1 cycle round. Implementation of the module 50 directly follows the above definition. In FIG. 7, $a_j$, $b_j$, $c_j$, $d_j$, $e_j$ generally denote the values of variables a, b, c, d, and e at the beginning of the j-th cycle round. The notation <<n generally denotes a module that performs left rotation by n bits. The depth of the module 50 is at least 33.

Similar to the case of SHA-2 family hash functions, the straightforward implementation for SHA-1 hash computation stage may be significantly optimized by application of some of the optimization techniques described herein above, as well as some techniques specific to the SHA-1 implementation. One optimization technique that may be applied to the SHA-1 cycle round implementation is the diagonal cut technique with the replacement of the lower triangle 104 and, optionally, replacement of the upper triangle 102 by parallelogram cycle rounds 100. The simplification of Maj and Ch functions also may be applied, but is not critical.

Figure 8:
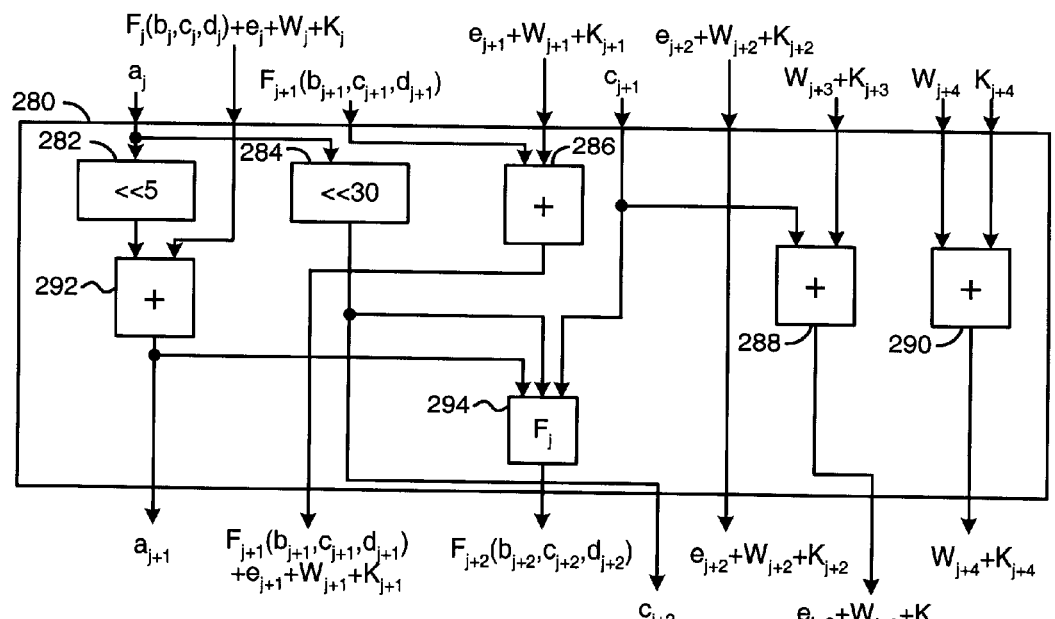
FIG. 8 is a diagram illustrating an implementation of a SHA-1 cycle round analog after a diagonal cut in accordance with an embodiment of the present invention.

Referring to FIG. 8, a block diagram is shown illustrating a module 280 as an example implementation of a SHA-1 cycle round after diagonal cut has been performed. The module 280 may be configured to receive a signal $a_j$, a signal representing the sum $F_j(b_j,c_j,d_j) + e_j + W_j + K_j$, a signal representing the value $F_{j+1}(b_{j+1},c_{j+1},d_{j+1})$, a signal representing the sum $e_{j+1} + W_{j+1} + K_{j+1}$, a signal $c_{j+1}$, a signal representing the sum $e_{j+2} + W_{j+2} + K_{j+2}$, a signal representing the sum $W_{j+3} + K_{j+3}$, a signal $W_{j+4}$ and a signal $K_{j+4}$. The module 280 may be configured to present a signal $a_{j+1}$, a signal representing the sum $F_{j+1}(b_{j+1}, c_{j+1},d_{j+1}) + e_{j+1} + W_{j+1} + K_{j+1}$, a signal representing the function $F_{j+2}(b_{j+2},c_{j+2},d_{j+2})$, a signal $c_{j+2}$, a signal representing the sum $e_{j+2} + W_{j+2} + K_{j+2}$, a signal representing the sum $e_{j+3} + W_{j+3} + K_{j+3}$, and a signal representing the sum $W_{j+4} + K_{j+4}$.

One optimization technique specific to the SHA-1 implementation is the parallelization of an adder and a module for performing the $F_j$ calculation. The technique may be applied after the diagonal cut technique. In one example, the module 280 may comprise a block (or circuit) 282, a block (or circuit) 284, a block (or circuit) 286, a block (or circuit) 288, a block (or circuit) 290, a block (or circuit) 290, a block (or circuit) 292 and a block (or circuit) 294. The block 282 may be configured to perform a left rotation by 5 bits. The block 284 may be configured to perform a left rotation by 30 bits. The blocks 286, 288, 290 and 292 may comprise modulus $2^{32}$ adders. The block 294 may be configured to perform the $F_j$ calculation. For example, after the diagonal cut technique is performed, one of the inputs for the $F_j$ calculation module 294 may be linked to the output of the mod $2^{32}$ adder 292, so the associated path is long. However, a fast adder implementation may first calculate XOR-bits (depth 2) and carry-bits (depth 9), and then calculate the final sum value.

Figure 9:
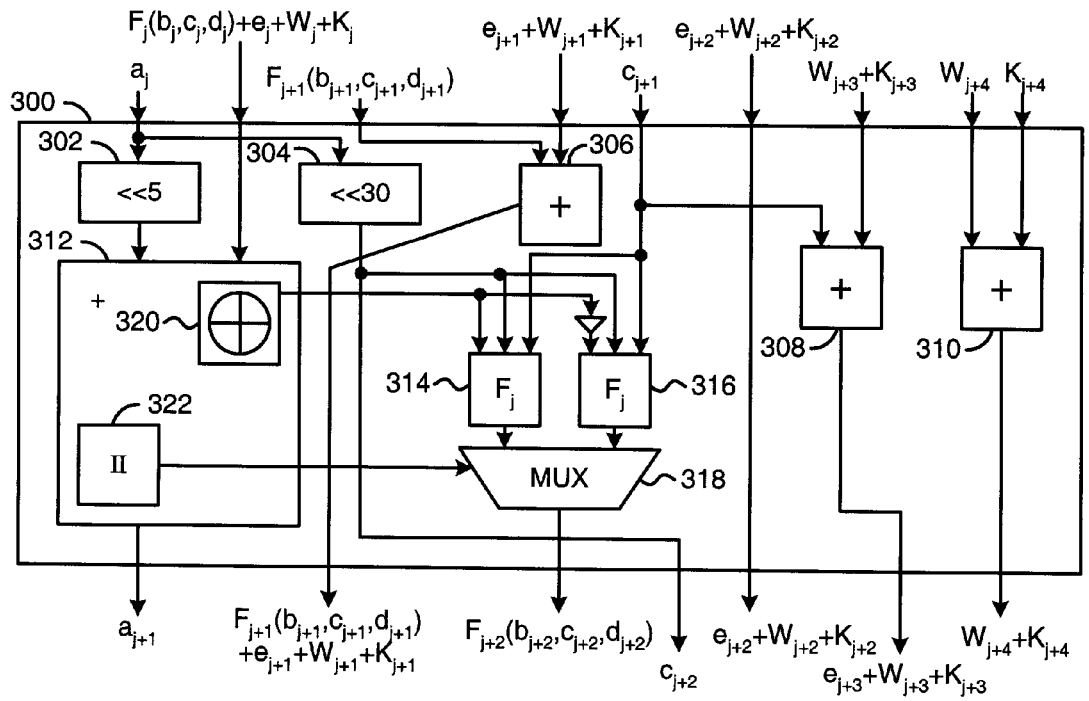
FIG. 9 is a diagram illustrating an implementation of a SHA-1 cycle round analog after throughput optimization in accordance with an embodiment of the present invention.

Referring to FIG. 9, a diagram of a module 300 is shown illustrating an example implementation of a SHA-1 parallelogram cycle round that uses the above optimization techniques. The module 300 may be configured to receive the signal $a_j$, the signal representing the sum $F_j(b_j,c_j,d_j) + e_j + W_j + K_j$, the signal representing the value $F_{j+1}(b_{j+1},c_{j+1},d_{j+1})$, the signal representing the sum $e_{j+1} + W_{j+1} + K_{j+1}$, the signal $c_{j+1}$, the signal representing the sum $e_{j+2} + W_{j+2} + K_{j+2}$, the signal representing the sum $W_{j+3} + K_{j+3}$, the signal $W_{j+4}$ and the signal $K_{j+4}$. The module 300 may be configured to present the signal $a_{j+1}$, the signal representing the sum $F_{j+1}(b_{j+1},c_{j+1}, d_{j+1}) + e_{j+1} + W_{j+1} + K_{j+1}$, the signal representing the function $F_{j+2}(b_{j+2},c_{j+2},d_{j+2})$, the signal $c_{j+2}$, the signal representing the sum $e_{j+2} + W_{j+2} + K_{j+2}$, the signal representing the sum $e_{j+3} + $ $W_{j+3}+K_{j+3}$, and the signal representing the sum $W_{j+4}+K_{j+4}$. The parallelization of the adder and $F_j$ calculation module may be performed as follows. Two modules for $F_j$ calculation may be used instead of one, and instead of linking one of the inputs of the $F_j$ module to the adder output, the corresponding input of the first $F_j$ module may be linked to the XOR-bits adder output, and the corresponding input of the second $F_j$ module is linked to a bitwise complement of the XOR-bits output. The calculation of the $F_j$ value may be performed via bitwise multiplexing of outputs of the two $F_j$ modules with carry-bits as the directive input. The optimization generally takes advantage of the fact that $F_j$ is a bitwise function. The parallelization of the adder and the module for $F_j$ calculation slightly increases the number of logic cells used, but greatly reduces the scheme depth.

The module 300 may comprise a block (or circuit) 302, a block (or circuit) 304, a block (or circuit) 306, a block (or circuit) 308, a block (or circuit) 310, a block (or circuit) 312, a block (or circuit) 314, a block (or circuit) 316 and a block (or circuit) 318. The block 302 may be configured to perform a left rotation by 5 bits. The block 304 may be configured to perform a left rotation by 30 bits. The blocks 306, 308 and 310 may comprise mod $2^{32}$ adders. The block 312 may be implemented as a full adder (FA). The blocks 314 and 316 may be configured to perform the $F_j$ calculation. The block 318 may be configured to perform bitwise multiplexing. The depth of the module 300 is 11 (e.g., the depth is equal to the depth of one mod $2^{32}$ adder). Thus, the depth of the module 300 in comparison with the module 50 is reduced at least three-fold by the application of the optimization techniques in accordance with the various aspects of the present invention.

The techniques in accordance with the present invention may also be applied to the generation of MD5 hash values. The processing of one block of a message by a MD5 hash computation stage may be defined as follows. The input may comprise a 512-bit message block $M_i$ and previous hash values $H_1^{i-1}, H_2^{i-1}, H_3^{i-1}, H_4^{i-1}$. A set of registers (e.g., a, b, c, and d) may be initialized with the previous hash values: $a:=H_1^{i-1}, b:=H_2^{i-1}, c:=H_3^{i-1}, d:=H_4^{i-1}$.

Then, the following cycle may be applied:
For j=0 to 63

$$T:=Rot L^{r_j}(a+F_j(b,c,d)+W_j+K_j)+b$$

$$a:=d$$

$$d:=c$$

$$c:=b$$

$$b:=T$$

The functions $r_j, F_j, W_j, K_j$ may be implemented as described below. Finally, the output is assigned. The output comprises new hash values $H_1^i, H_2^i, H_3^i, H_4^i$, where $$H_1^i:=a+H_1^{i-1}, H_2^i:=b+H_2^{i-1}, H_3^i:=c+H_3^{i-1}, H_4^i:=d+H_4^{i-1}.$$

Using the notation from above, the functions $F_j$ are defined as follows:
if j=0, 1, . . . , 15 then $$F_j(x,y,z)=(x \land y) \lor (\neg x \land z)$$

if j=16, 17, . . . , 31 then $$F_j(x,y,z)=(x \land z) \lor (y \land \neg z)$$

if j=32, 33, . . . , 47 then $$F_j(x,y,z)=x \oplus y \oplus z$$

if j=48, 49, . . . , 63 then $$F_j(x,y,z)=y \oplus (x \lor \neg z).$$

Let $M_i^0$ be the first 32 bits of the message $M_i$, $M_i^1$ be the next 32 bits of this message, and so on up to $M_i^{15}$. The values $W_j$ are defined as follows:
if j=0, 1, . . . , 15 then $W_j=M_i^j$,
if j=16, 17, . . . , 31 then $W_j=M_i^{5 \cdot j+1 \bmod 16}$,
if j=32, 33, . . . , 47 then $W_j=M_j=M_i^{3 \cdot j+5 \bmod 16}$,
if j=48, 49, . . . , 63 then $W_j=M_i^{7 \cdot j \bmod 16}$.

The notation $K_j$ denotes a sequence of predefined constant words equal to the integer part of the absolute value of the number $2^{32} \cdot \sin(j+1)$. The notation $r_j$, j=0, 1, . . . , 63, denotes a sequence of the integer numbers (e.g., 7, 12, 17, 22, 7, 12, 17, 22, 7, 12, 17, 22, 7, 12, 17, 22, 5, 9, 14, 20, 5, 9, 14, 20, 5, 9, 14, 20, 5, 9, 14, 20, 4, 11, 16, 23, 4, 11, 16, 23, 4, 11, 16, 23, 4, 11, 16, 23, 6, 10, 15, 21, 6, 10, 15, 21, 6, 10, 15, 21, 6, 10, 15, 21).

Figure 10:
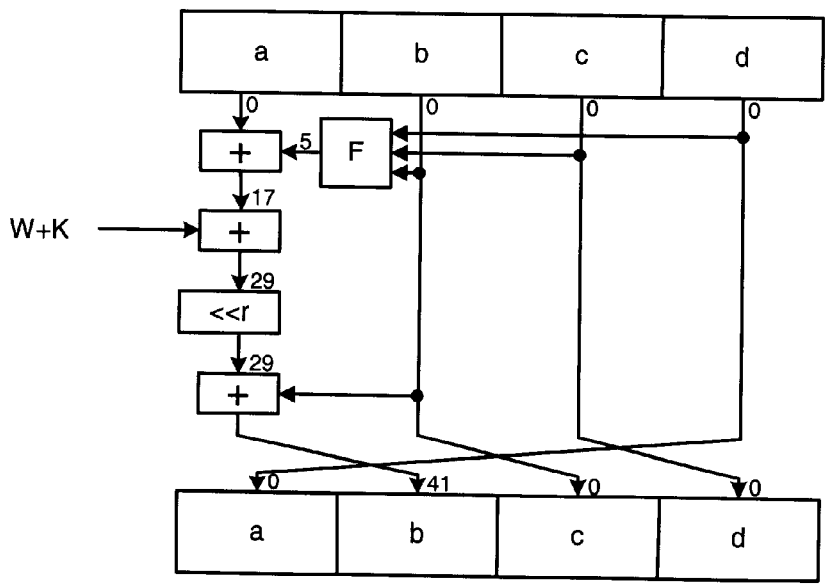
FIG. 10 is a diagram illustrating a straightforward implementation of a MD5 cycle round.

Referring to FIG. 10, a diagram of a module 80 is shown illustrating an example of a straightforward implementation of a MD5 cycle round. Implementation of the module 80 directly follows the above definition. In FIG. 10, <<r denotes a module that performs left rotation by r bits, F denotes the module that performs the bitwise operation $F_j$, and W, K, and r denote $W_j, K_j$, and $r_j$ respectively). The depth of the module 80 is at least 41. Similarly to the previously considered hash functions, the straightforward implementation of the MD5 hash computation stage may be optimized using some of the above optimization techniques as well as some techniques specific to MD5.

One optimization technique above that may be applied to the MD5 cycle round implementation is the diagonal cut technique. The technique of the simplification of two successive additions may also be used. The MD5 specific technique may comprise the permutation of the r bits left rotation operator and the addition operator. The left rotation of a sum of two numbers may be calculated by calculating the sum of the rotated arguments and adding one of a number of constants (e.g., $C_0, C_1, C_2, C_3$) to the result. The choice of the particular constant $C_0, C_1, C_2$, or $C_3$ depends on the carry bits that appear during the calculation of the sum of the operands. The carry bits may be calculated simultaneously with the main stream of the calculation. Grouping successive additions is beneficial, because a transformation may be applied that replaces two successive additions by one addition plus some minor transformations. However, in the MD5 definition, successive additions are separated by a shift operator, so straightforward application of the transformation becomes inapplicable.

In one example, an expression (a+b)<<<k, where + denotes addition modulo $2^{32}$ and <<<k denotes a k-bit cyclic shift, may be replaced with an equivalent expression ((a<<<k)+(b<<<k)+c), where c depends on (i) the value of k, the value of a carry bit in the sum (a+b) at the leftmost position (e.g., denoted by $cb_0$) and the value of a carry bit at the position number k counting from the left side (e.g., denoted by $cb_1$). In the present case, values of k are generally fixed, so consideration may be limited to the appropriate carry bits. The reason for considering the carry bits is the following. When addition of shifted values is performed, the carry bit $cb_1$ is lost (but, if the carry bit $cb_1$ was equal to 1, 1 has to be added to the rightmost position, because in the original sum—a+b—the carry bit $cb_1$ was considered) and an extra carry bit $cb_0$ is gained (the carry bit $cb_0$ is considered in the sum of shifted values, but the carry bit $cb_0$ was not considered in the original sum). If the carry bit $cb_0=1$, the influence of the carry bit needs to be eliminated by adding a constant value starting with (32−k+1) ones followed by (k−1) zeroes.

The constants corresponding to the carry bits $cb_0$ and $cb_1$ may be added together to produce four possible cases (e.g., represented by the constants $C_1, C_2, C_3$ and $C_4$). In a first case represented by $C_1$, the carry bit $cb_0=0$ and the carry bit $cb_1=0$. In the first case c should be set equal to 0. In a second case represented by $C_2$, the carry bit $cb_0=0$ and the carry bit $cb_1=1$. In the second case, c should be set equal to 1. In a third case represented by $C_3$, the carry bit $cb_0=1$ and the carry bit $cb_1=0$. In the third case c should be put equal to a value comprising (32−k+1) ones followed by (k−1) zeroes (e.g., for k=28, c=11111000000000000000000000000000). In a fourth case represented by $C_4$, the carry bit $cb_0=1$ and the carry bit $cb_1=1$. In the fourth case, c should be put equal to a value comprising (32−k+1) ones, followed by (k−1) zeroes, followed by 1 (e.g., for k=28, c=11111000000000000000000000000001).

Figure 11:
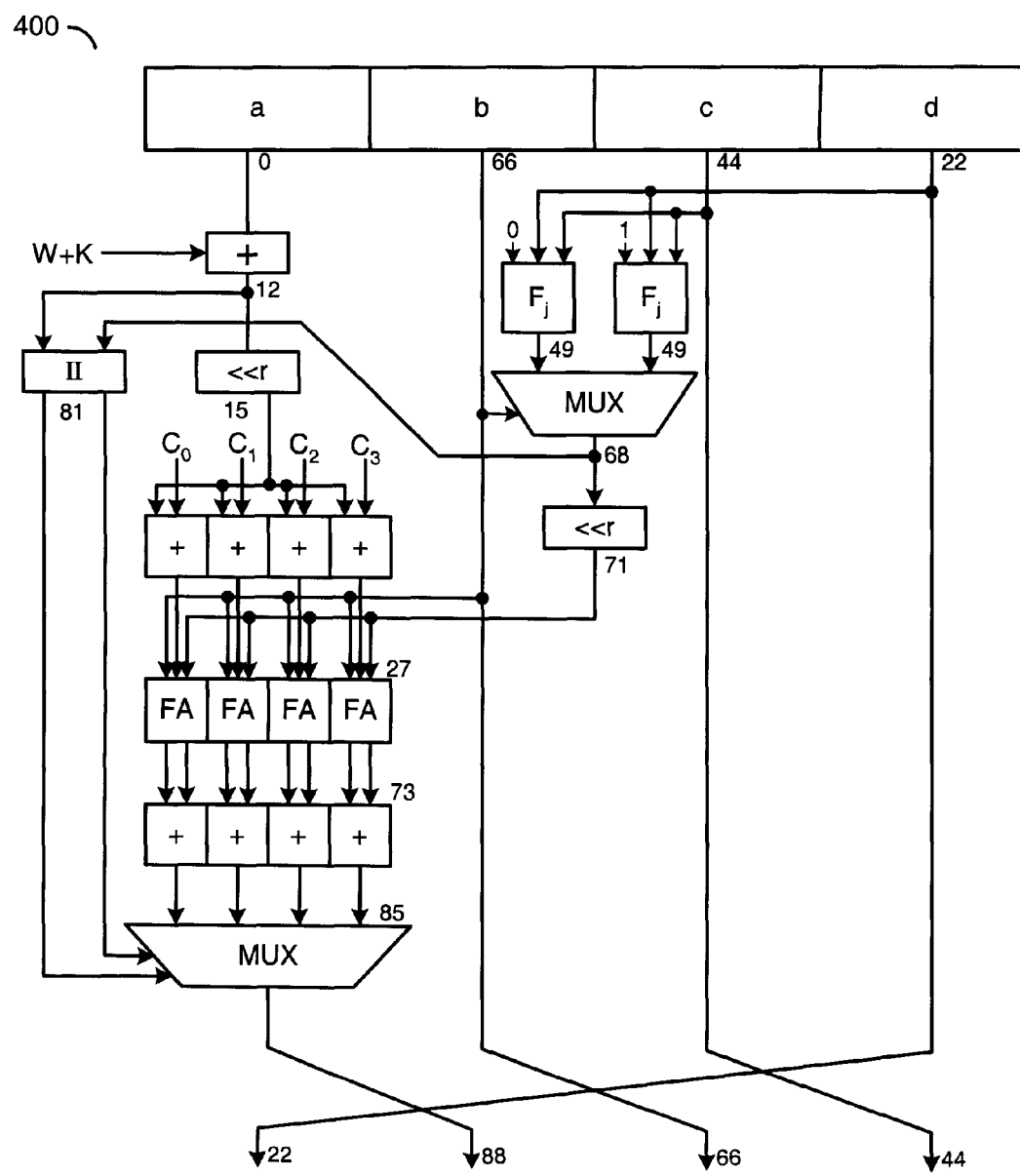
FIG. 11 is a diagram illustrating an implementation of a MD5 cycle round analog after throughput optimization in accordance with an embodiment of the present invention.

Referring to FIG. 11, a diagram of a module 400 is shown illustrating an example implementation of a MD5 parallelogram cycle round analog in accordance with embodiments of the present invention. The module 400 generally implements optimization techniques in accordance with various aspects of the present invention. The depth of the module 400 is 22. In FIG. 11, FA denotes a bitwise full adder, and Π denotes an operator of carry bit calculation of a sum of two arguments. In general, the MD5 parallelogram cycle round analog 400 may utilize an adder decomposition similar to the one used in the SHA-1 example (described above in connection with FIG. 9). In general, adders may be implemented such that XORed bits and carry bits may be extracted with little or no cost.

The implementation of hash computation stages was performed for all SHA-2 family hash functions and for SHA-1. All the above optimization techniques were applied. The number of successively linked modules that implement one analog of a cycle round was varied. Statistics of the resulting schemes for SHA-1 and SHA-256 (e.g., depth, number of used logic cells (including NOT, OR, AND, XOR, MUX), number of used flip-flops, number of time units (or clock cycles) utilized to process one block of a padded message, and scheme throughput (measured in bits per time unit)) are summarized in the following TABLE 1:

TABLE 1

| Technique | No. of cycle rounds during one time unit | Scheme depth | No. of used logical cells | No. of used flip-flops | No. of time units utilized to process one block | Bits per time unit |
|---|---|---|---|---|---|---|
| SHA-1 | 3 | 37 | 8470 | 942 | 29 | 17.65 |
| SHA-1 | 4 | 46 | 10434 | 942 | 22 | 23.27 |
| SHA-1 | 5 | 57 | 12389 | 781 | 17 | 30.11 |
| SHA-1 | 6 | 68 | 14344 | 942 | 15 | 34.13 |
| SHA-256 | 2 | 38 | 12557 | 1035 | 35 | 14.62 |
| SHA-256 | 3 | 54 | 16710 | 938 | 23 | 22.26 |
| SHA-256 | 4 | 71 | 21379 | 1035 | 18 | 28.44 |
| SHA-256 | 5 | 88 | 25669 | 938 | 14 | 36.57 |

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    an initialization circuit configured to present a number of initialization values for a predetermined hash function; and
    a hash computation circuit configured to generate final hash values for a message in response to padded message blocks and said initialization values, wherein said hash computation circuit performs a diagonal cut technique that simultaneously uses one or more previously generated intermediate hash values from a first set of cycle rounds of said predetermined hash function to generate intermediate hash values for a second set of cycle rounds of said predetermined hash function in a single cycle round analog.

2. The apparatus according to claim 1, wherein said single cycle round analog comprises a parallelogram cycle round.

3. The apparatus according to claim 1, wherein said hash values are generated using a secure hash function selected from the group consisting of MD5, SHA-1, SHA-224, SHA-256, SHA-384 and SHA-512.

4. The apparatus according to claim 1, further comprising:
    a preprocessing circuit configured to generate a padded message in response to said message, parse the padded message into said padded message blocks, and set the number of initialization values.

5. The apparatus according to claim 4, wherein said the number of initialization values is set using previously generated hash values.

6. The apparatus according to claim 1, wherein generation of a padded message in response to said message, parsing of the padded message into said padded message blocks, and setting of the number of initialization values are performed externally to said apparatus.

7. The apparatus according to claim 1, further comprising an embedded processor executing software configured to generate a padded message in response to said message, parse the padded message into said padded message blocks, and set the number of initialization values.

8. The apparatus according to claim 1, wherein said hash computation circuit comprises:
    a first function block, having an input that receives a first initialized value, and having an output;
    a second function block, having a first input receiving said first initialized value, having a second input receiving a second initialized value, having a third input receiving a third initialized value, and having an output;
    a third function block, having an input receiving a fourth initialized value, and having an output;
    a fourth function block, having a first input receiving said fourth initialized value, having a second input receiving a fifth initialized value, having a third input receiving a sixth initialized value, and having an output;
    a first logic block, having a first input connected to the output of the first function block, having a second input connected to the output of the second function block, having a third input receiving a seventh initialized value, and having an output;
    a second logic block, having a first input connected to the output of the third function block, having a second input connected to the output of the fourth function block, having a third input receiving a first sum signal, and having an output;
    a third logic block, having a first input connected to the output of the third function block, having a second input connected to the output of the fourth function block, having a third input receiving a second sum signal, and having an output;
a fourth logic block, having a first input receiving a predefined constant word, having a second input receiving a signal generated based on said padded message blocks, and having an output;
a fifth logic block, having a first input receiving said fifth initialized value, having a second input receiving a third sum signal, and having an output; and
a sixth logic block, having a first input receiving said second initialized value, having a second input receiving a fourth sum signal, and having an output.

9. The apparatus according to claim 8, wherein:
said first logic block comprises a pair of mod $2^{32}$ adders;
said second logic block comprises a pair of mod $2^{32}$ adders; and
said third logic block comprises a pair of mod $2^{32}$ adders.

10. The apparatus according to claim 8, wherein:
said first logic block comprises a full adder and a mod $2^{32}$ adder;
said second logic block comprises a full adder and a mod $2^{32}$ adder; and
said third logic block comprises a full adder and a mod $2^{32}$ adder.

11. The apparatus according to claim 8, wherein:
said first function block is comprised of $$\Sigma_0(x) = \text{Rot}R^2(x) \oplus \text{Rot}R^{13}(x) \oplus \text{Rot}R^{22}(x).$$

12. The apparatus according to claim 8, wherein:
said second function block is comprised of $$Maj(x,y,z) = (x \wedge y) \vee (y \wedge z) \vee (x \wedge z).$$

13. The apparatus according to claim 8, wherein:
said second function block is comprised of $$Maj(x,y,z) = (\neg x \wedge (y \wedge z)) \vee (x \wedge (y \vee z)).$$

14. The apparatus according to claim 8, wherein:
said third function block is comprised of $$\Sigma_1(x) = \text{Rot}R^6(x) \oplus \text{Rot}R^{11}(x) \oplus \text{Rot}R^{25}(x).$$

15. The apparatus according to claim 8, wherein:
said fourth function block is comprised of $$Ch(x,y,z) = (x \wedge y) \vee (\neg x \wedge z).$$

16. The apparatus according to claim 8, wherein said hash computation circuit further comprises a seventh logic circuit configured to generate a plurality of constant words in response to an input signal identifying a corresponding cycle round number.

17. The apparatus according to claim 1, wherein said hash computation circuit comprises:
a first logic circuit configured to left rotate an input by five bits, wherein said input comprises a first initialized value from a first cycle round of said first set of cycle rounds;
a second logic circuit configured to left rotate an input by 30 bits, wherein said input comprises said first initialized value from said first cycle round of said first set of cycle rounds;
a first mod $2^{32}$ adder configured to sum an F-value and a first sum signal from a second cycle round of said first set of cycle rounds;
a second mod $2^{32}$ adder configured to sum a second initialized value from said second cycle round of said first set of cycle rounds and a second sum signal from a third cycle round of said first set of cycle rounds;
a third mod $2^{32}$ adder configured to sum a predefined constant word and a signal generated based upon said padded message blocks from a fourth cycle round of said first set of cycle rounds;
a third logic circuit configured to generate a bitwise xor of an output of said first logic circuit and a third sum signal from said first cycle round of said first set of cycle rounds;
a fourth logic circuit configured to perform a carry bit calculation of a sum of said output of said first logic circuit and said third sum signal from said first cycle round of said first set of cycle rounds;
a first F-value calculation circuit configured to generate an output based upon an output of said second logic circuit, an output of said third logic circuit, and said second initialized value from said second cycle round of said first set of cycle rounds;
a second F-value calculation circuit configured to generate an output based upon said output of said second logic circuit, a complement of said output of said third logic circuit, and said second initialized value from said second cycle round of said first set of cycle rounds; and
a bitwise multiplexing circuit configured to select between the output of said first F-value calculation circuit and the output of said second F-value calculation circuit based upon an output of said fourth logic circuit.

18. The apparatus according to claim 1, wherein said hash computation circuit comprises:
a first F-value calculation circuit;
a second F-value calculation circuit;
a first bitwise multiplexing circuit coupled to said first and said second F-value calculation circuits;
a first logic block coupled to said first bitwise multiplexing circuit and configured to left rotate an input by a predetermined number of bits associated with each cycle round;
a first mod $2^{32}$ adder;
a second logic block coupled to said first mod $2^{32}$ adder and configured to left rotate an input by the predetermined number of bits associated with each cycle round;
a first plurality of mod $2^{32}$ adders coupled to said second logic block;
a plurality of full adders coupled to said first plurality of mod $2^{32}$ adders and said first logic block;
a second plurality of mod $2^{32}$ adders coupled to said plurality of full adders;
a product circuit configured to perform a carry bit calculation of a sum of two arguments, said circuit coupled to said first mod $2^{32}$ adder and said first bitwise multiplexing circuit; and
a second bitwise multiplexing circuit coupled to said second plurality of mod $2^{32}$ adders and said product circuit.

19. An apparatus comprising:
means for generating a padded message in response to a message, parsing the padded message into padded message blocks, and setting a number of initialization values for a predetermined hash function; and
means for generating final hash values for said message in response to said padded message blocks and said initialization values, wherein said hash generating means performs a diagonal cut technique that simultaneously uses one or more previously generated intermediate hash values from a first set of cycle rounds of said predetermined hash function to generate intermediate hash values for a second set of cycle rounds of said predetermined hash function in a single cycle round analog.

20. A method of generating hash values for a message comprising the steps of:
generating a padded message in response to said message;
parsing the padded message into padded message blocks;
setting a number of initialization values for predetermined hash function; and
generating final hash values for the message in response to said padded message blocks and said initialization values by using a logic circuit configured to perform a diagonal cut technique that simultaneously uses one or more previously generated intermediate hash values from a first set of cycle rounds of said predetermined hash function to generate intermediate hash values for a second set of cycle rounds of said predetermined hash function in a single cycle round analog.

21. The apparatus according to claim 8, wherein:
said first initialized value, said second initialized value, and said third initialized value are from a first cycle round of said first set of cycle rounds of said predetermined hash function;
said fourth initialized value, said fifth initialized value, said sixth initialized value, said first sum signal, and said second sum signal are from a second cycle round of said first set of cycle rounds of said predetermined hash function;
said predefined constant word and said signal generated based on said padded message blocks are from a third cycle round of said first set of cycle rounds of said predetermined hash function;
said third sum signal is from a fourth cycle round of said first set of cycle rounds of said predetermined hash function; and
said fourth sum signal is from a fifth cycle round of said first set of cycle rounds of said predetermined hash function.

* * * * *